United States Patent [19]

Taylor et al.

[11] 4,178,475
[45] Dec. 11, 1979

[54] METHOD AND CONTROL APPARATUS FOR RADIO PAGING SYSTEMS

[75] Inventors: Frank D. Taylor; Ronald J. Novotny, both of Omaha, Nebr.

[73] Assignee: General Communications Co., Inc., Omaha, Nebr.

[21] Appl. No.: 884,820

[22] Filed: Mar. 9, 1978

[51] Int. Cl.$^2$ ............................................. H04Q 7/04
[52] U.S. Cl. ................................................. 179/2 EC
[58] Field of Search ................ 179/2 EB, 2 EC, 2 A; 325/55

[56] References Cited

U.S. PATENT DOCUMENTS

| | | | |
|---|---|---|---|
| Re. 27,782 | 10/1973 | Andrews et al. | 179/2 A |
| 3,575,558 | 4/1971 | Leyburn et al. | 179/2 EB |
| 3,818,145 | 6/1974 | Hanway | 179/2 EC |
| 3,836,726 | 9/1974 | Wells et al. | 179/2 EC |
| 4,006,316 | 2/1977 | Bolgiano | 179/2 A |

OTHER PUBLICATIONS

Telephony, Aug. 5, 1967, Ray Blain, "Radio Paging Systems", p. 20.

Primary Examiner—William C. Cooper
Attorney, Agent, or Firm—Lowe, Kokjer, Kircher, Wharton & Bowman

[57] ABSTRACT

A control apparatus for an automatic radio paging system comprising a paging tone encoder circuit for generating a plurality of paging signals, a radio transmitter for transmitting the paging signals and a plurality of mobile pagers which are each tuned to a different paging signal. In particular, the control apparatus of the present invention communicatively coupled a Touch-Tone telephone subset with a radio paging system such that the person making the page is capable of initiating and controlling the paging operation from a remote telephone subset. The control apparatus provides the calling party with access to the radio paging system only after the calling party submits a properly coded access signal to the control apparatus. Thereafter, the calling party is free to initiate a page by sending paging information to the control apparatus from a Touch-Tone telephone subset. In response to this paging information, the control apparatus generates and transmits a paging signal corresponding to the mobile pager of the party being paged. Following transmission of the paging signal, the control apparatus couples the calling subset with the radio transmitter so that the calling party can transmit a voice communication to the paged party. The control apparatus is designed for use with a local or remote transmitter.

27 Claims, 3 Drawing Figures

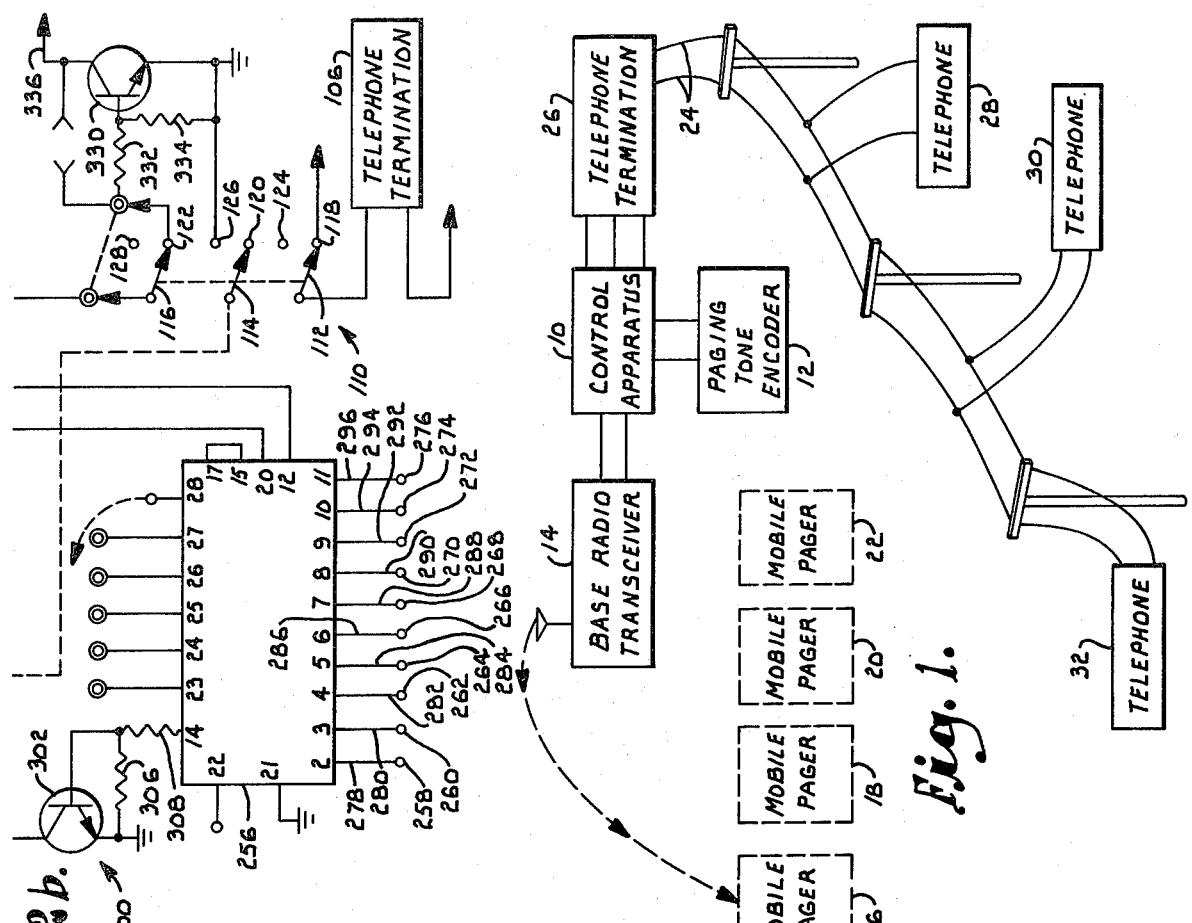
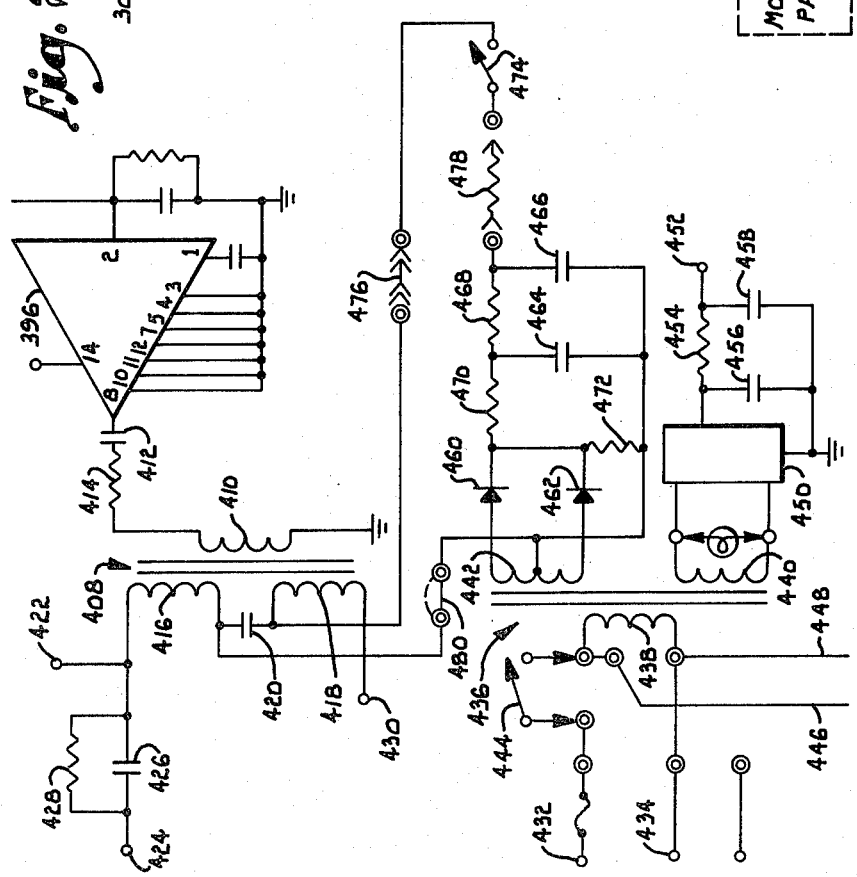

METHOD AND CONTROL APPARATUS FOR RADIO PAGING SYSTEMS

BACKGROUND AND BRIEF DESCRIPTION OF THE INVENTION

This invention relates in general to a control apparatus for communicatively coupling a Touch-tone telephone network to a radio paging system such that the person making the page is capable of initiating and controlling the paging operation from a remote telephone subset.

Radio paging systems are well known in the prior art. These systems are typically comprised of a paging tone encoder circuit for generating a coded paging signal representative of the party being paged, a radio transmitter for transmitting the coded paging signals, and a mobile pager for notifying the bearer of the pager that he is being paged. Upon being notified of a page, the bearer of the pager responds by engaging in a prearranged course of action such as calling a set telephone number to receive further instructions.

The paging tone encoder circuit generates a coded paging signal in response to paging information which designates the person to be paged. This information is provided to the paging tone encoder circuit either manually or automatically. In a manual system, an operator accepts information concerning the party to be paged from the party making the page. The operator then initiates the page by looking up the paging signal corresponding to the designated person and then programming the paging tone encoder circuit to generate the appropriate paging signal. An automatic paging system, on the other hand, employs control circuitry which automatically receives paging information from a calling party over a telephone line. The control circuitry is assigned a telephone number and the party initiates a page by dialing this number. The control circuitry automatically answers the call and accepts paging information from the calling party over the telephone line. This paging information is provided to the control circuitry in the form of a coded sequence of audio tones which are generated by depressing the appropriate buttons on a Touch-Tone dial encoder associated with the calling subset. The control circuitry then decodes the received paging information and automatically programs the paging tone encoder circuit. Once the encoder is properly programmed, the radio transmitter is activated and the paging signal is transmitted to the mobile pagers which are within the range of the transmitter. Each mobile pager is tuned to respond to a different paging signal so that only the receiver corresponding to the transmitted paging signal is activated. The pager responds to its corresponding paging signal by emitting an audible tone or some other appropriate signal.

While automatic radio paging systems are well known in the prior art, none of these systems are capable of restricting access to the paging equipment. In other words, the prior art automatic radio paging systems answer all incoming telephone calls and provide the calling party with direct access to the radio paging system as soon as the phone connection is made. Therefore, any party dialing the telephone number associated with the radio paging system gains direct access to the paging equipment and may intentionally or unintentionally initiate an unauthorized page by depressing the appropriate buttons on his Touch-Tone dial encoder. To improve security, some automatic radio paging systems utilize a large number of code combinations to serve a limited number of mobile pagers to thereby decrease the probability that an unauthorized page will be initiated. This type of security arrangement is very ineffective since there is no guarantee that the calling party will not inadvertently send a code combination corresponding to a mobile pager and is also very inefficient since the paging system is not working up to its maximum capacity.

It is therefore an object of the present invention to provide a method and control apparatus for communicatively coupling a Touch-tone telephone subset to a radio paging system comprising a paging tone encoder circuit, a radio transmitter, and a plurality of mobile pagers such that access to the paging system is restricted to persons providing a properly coded access signal to the control apparatus. The access signal is comprised of a coded sequence of tone signals which are generated by depressing the appropriate buttons on the Touch-tone dial encoder at the calling telephone subset. The control apparatus of the present invention decodes and validates the received access code before providing the calling party with access to the radio paging system. The access code is validated by comparing the received sequence of tone signals with a coded sequence of tone stored in the control apparatus. If these two groups of signals do not coincide, the calling party is not provided access to the paging system.

Another object of the present invention is to provide a method and control apparatus for communicatively coupling a Touch-Tone telephone subset to a radio paging system comprising a paging tone encoder circuit, a radio transmitter, and a plurality of mobile pagers such that the telephone connection between the calling subset and the control apparatus is automatically broken if a properly coded access signal is not received by the control apparatus within a specified period of time. Upon answering the telephone call, the control apparatus generates an annunciator signal which is sent to the calling party over the telephone network. The annunciator signal informs the calling party that his telephone call has been answered and that the control apparatus is in condition to receive the coded access signal. Upon receipt of a properly coded access signal, the calling party gains access to the paging system and may then send paging information to the control apparatus in the form of a coded sequence of tone signals which are indicative of the party to be paged. These tone signals are generated at the calling subset by depressing the appropriate buttons on the Touch-Tone dial encoder at the calling subset. The control apparatus then decodes the received tone signals and automatically programs the paging tone encoder circuit to generate the appropriate paging signal. Once the paging tone encoder circuit is programmed, the radio transmitter is activated and the paging signal is broadcast causing the pager tuned to the paging signal to respond by generating an alert signal.

A further object of the present invention is to provide a method and control apparatus for communicatively coupling a Touch-Tone telephone subset to a radio paging system comprising a paging tone encoder, a radio transmitter, and a plurality of mobile pagers wherein voice communication may be maintained between the paging party and the party paged for a specified period of time after the page. The control apparatus includes a master timer circuit which controls the time period for one-way vocal communication between the calling party and the mobile pager. Upon completion of the time period, the control apparatus automatically disconnects the phone connection between the calling subset and the control apparatus, deactivates the paging tone encoder circuit, and shuts off the radio transmitter.

It is a further object of the present invention to provide a method and control apparatus for communicatively coupling a Touch-Tone telephone subset to a radio paging system comprising a paging tone encoder circuit, a radio transmitter, and a plurality of mobile pagers wherein the control apparatus may be placed at a location remote from the radio transmitter of the system. The control apparatus is capable of producing a DC transmitter control signal which controls the operation of the remote radio transmitter. The transmitter control signal and the paging tones which make up the paging signal are then provided to the radio transmitter over a leased telephone line or some other appropriate transmission line which connects the control apparatus to the radio transmitter.

It is an additional object of the present invention to provide a method and control apparatus for communicatively coupling a Touch-Tone telephone subset to a radio paging system comprising a paging tone encoder circuit, a radio transmitter, and a plurality of mobile pagers such that the licensee of the radio transmitter is capable of maintaining exclusive control over the operation of the transmitter as specified by the rules and regulations of the Federal Communications Commission. The licensee of the radio transmitter is capable of maintaining exclusive control over the operation of the radio transmitter because access to the transmitter is restricted by the control apparatus. The control apparatus restricts access to authorized persons by requiring the calling party to submit a properly coded access signal to the apparatus before acquiring access to the radio paging system. Furthermore, the calling party is capable of controlling the paging operation of the radio paging system from the calling subset. For example, the calling party is capable of discontinuing the paging operation at any time by providing a disconnect signal to the control apparatus. In response to this signal, the control apparatus deactivates the radio transmitter, breaks the telephone connection between the calling subset and the control apparatus, and disables the paging tone encoder circuit. The calling party is also capable of initiating a second page without redialing the telephone number corresponding to the control apparatus by simply sending the access code to the pager a second time. Furthermore, the calling party is capable of resetting the access timer and sending a new access code to the control apparatus if an improper access code was accidentally sent to the control apparatus. Finally, the control apparatus sends the tone signals which make up the paging signal to the calling party as the signals are being transmitted by the radio transmitter. These signals can be used at the calling subset to energize a light thereby providing a visual indication that the radio transmitter is operating.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a block diagram of a radio paging system employing the control apparatus of the present invention;

FIGS. 2a and 2b are to be arranged to provide a detailed schematic diagram of the control apparatus of the present invention; and FIG. 3 is a plot showing how FIGS. 2a and 2b are to be arranged for proper viewing.

Figure 2A:
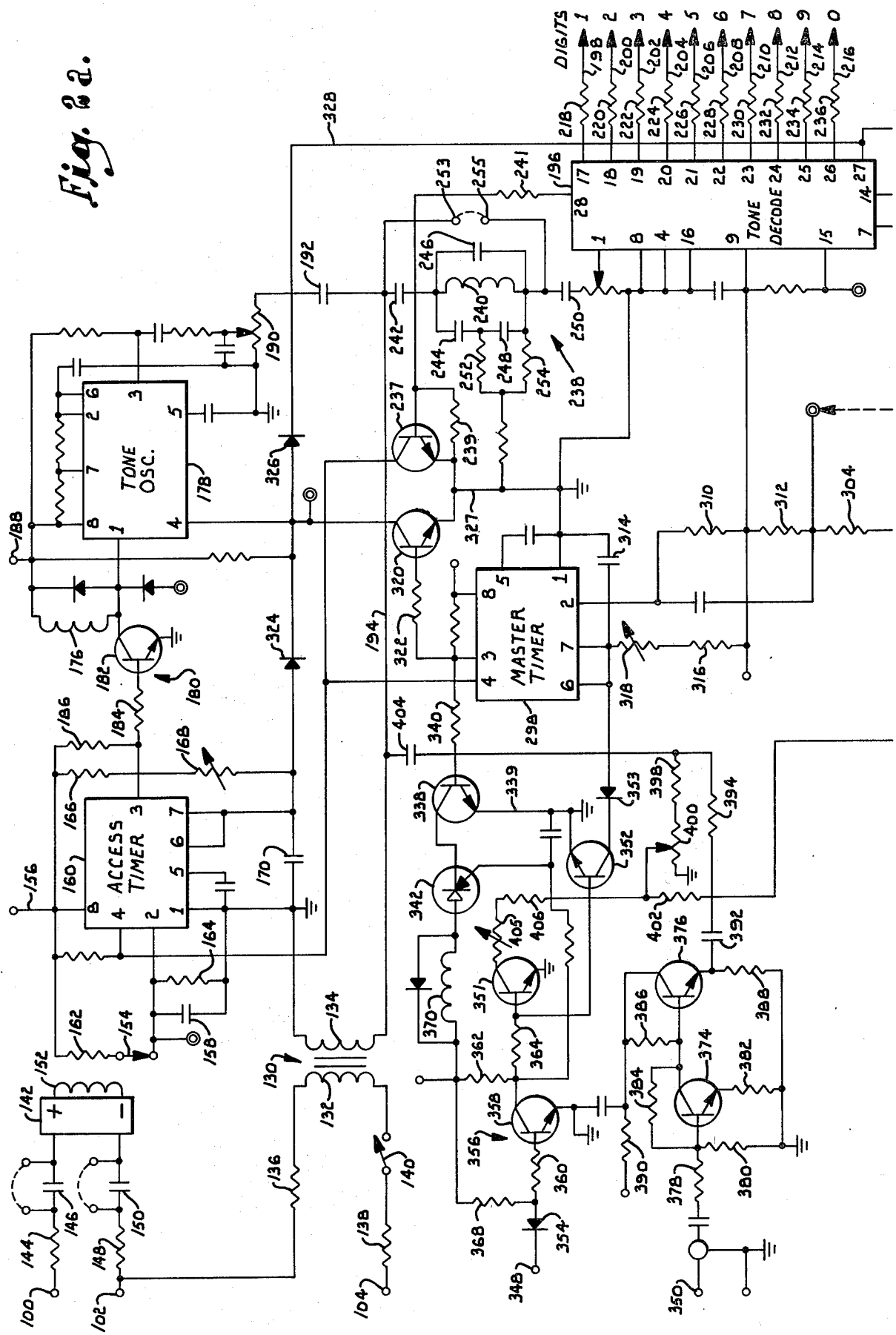

As shown in FIG. 1, the control apparatus 10 of the present invention is arranged to communicatively couple a radio paging system comprising a paging tone encoder circuit 12, a radio transmitter 14, and a plurality of mobile pagers 16, 18, 20 and 22 with a Touch-tone telephone network which is represented in this figure by transmission lines 24 and telephone subsets 28, 30 and 32. Telephones 28, 30 and 32 are preferably Touch-Tone telephones. "Touch-Tone" is a registered trademark of the American Telephone and Telegraph Company and represents telephones having a push button telephone dial encoder which produces a unique audio frequency tone in response to depression of a particular button on the dial encoder. The standard Touch-Tone dial encoder has either 12 or 16 buttons with each button being operable to generate a unique audio frequency tone when it is depressed. It should be emphasized at this time that the present invention is compatible with telephone dial encoders having any number of buttons and may even be used in conjunction with a separate tone generator which is either electrically or acoustically connected to the telephone subset. The control apparatus is connected to the telephone network by means of a telephone termination circuit 26 and a leased telephone line. The telephone termination circuit associated with the radio paging system is assigned its own telephone number so that a remote telephone subset may contact the radio paging system by dialing this number.

A party initiates a page from a remote telephone subset by dialing the telephone number corresponding to the telephone termination circuit 26. Upon dialing the telephone number assigned to the telephone termination circuit, the switching equipment of the telephone network connects the calling subset to the telephone termination network causing a ring pulse signal to be generated therein. In response to this ring pulse signal, the control apparatus 10 completes a phone connection with the calling telephone subset thereby answering the incoming telephone call.

Upon answering the incoming call, the control apparatus generates an annunciator signal and activates an access timer. The annunciator signal is a continuous audio tone which is provided to the calling party over the telephone network. The annunciator signal announces to the calling party that his telephone call has been answered and that the control apparatus is in condition to receive the coded access signal. A properly coded access signal must be submitted to the control apparatus within the time period established by the access timer. If a properly coded access signal is not received within this set period of time, the control apparatus automatically breaks the telephone connection between the calling subset and the paging apparatus.

The access signal is comprised of a coded sequence of tone signals which are generated by depressing the buttons on the Touch-Tone dial encoder which correspond to the digits of the access code. The length of the access code is variable and the digits of the code may be changed periodically to improve the security of the radio paging system. By using a coded access signal, the licensee of the transmitter may selectively disseminate the code to persons authorized to use the paging apparatus thereby maintaining strict control over the use of the radio paging system. In this way, unauthorized or accidental use of the paging system is significantly controlled since access to the paging system is limited to persons having the access code.

As the digits of the access code are received, the control apparatus of the present invention decodes the received digits and checks the validity of the access code. The validity of the access code is checked by comparing the received digits against the digits of a reference code stored in the control apparatus. If a valid access code is received within the time period established by the access timer, the annunciator signal is disabled, a master timer is activated the paging tone encoder circuit is activated, and the access timer is inhibited to keep the telephone connection from being broken. Discontinuation of the annunciator tone serves as an audible signal to the calling party that a valid access code has been received and that the control apparatus is now in condition to accept paging information from the calling subset. Paging information is provided to the control apparatus in the form of a selection signal which is a set sequence of tone signals representative of the party to be paged. Each party is assigned a unique selection signal comprising one or more digits. The calling party generates this selection signal at the telephone subset by depressing the buttons on the Touch-Tone dial encoder which correspond to the digits of the selection signal. The generated selection signal is sent from the calling subset to the paging apparatus over the telephone network. The control apparatus decodes the received selection signal and programs the paging tone encoder circuit to generate the appropriate paging signal.

The paging tone encoder circuit produces a paging signal in response to the received selection signal. The paging signal is a sequence of audio tones which are coded in accordance with the type of signaling used by the system. Upon receipt of the last digit of the selection signal, the control apparatus activates the radio transmitter and provides the audio tones of the paging signal to the transmitter where they are used to modulate the transmitter to broadcast the paging signal. As the audio tones of the paging signal are transmitted, they are simultaneously sent to the calling party over the telephone line so that the calling party hears the audio tones of the paging signal as they are transmitted. The audio tones can be used by a control circuit at the telephone subset to energize a light to thereby provide a visual indication that the tones are being transmitted. The control apparatus also inhibits the timing sequence of the master timer while the paging signal is being transmitted.

The mobile pager corresponding to the transmitted paging signal responds to this signal by producing an audible signal or some other form of signal capable of alerting the party being paged. Following transmission of the paging signal, the control apparatus connects the calling party with the radio transmitter so that the calling party may send a voice communication to the paged party. In this way, the calling party may provide the paged party with a limited amount of verbal information.

When the master timer reaches the end of its timing sequence, the annunciator signal is once again enabled, the timing cycle of the access timer is allowed to continue, and the paging tone encoder circuit is deactivated. Activation of the annunciator signal signifies to the calling party that the time period for verbal communication with the paged party is drawing to a close. Once the access timer reaches the end of its timing cycle, the phone connection between the control apparatus and the calling telephone subset is automatically broken and the radio transmitter is deactivated. Thereafter, the control apparatus is in condition to answer another incoming telephone call.

It should be pointed out at this time that the control apparatus of the present invention also provides a number of unique control features which are not taught by the prior art. In particular, these control features allow the calling party to control the operation of the radio paging system from the remote telephone subset. These control features include the ability to terminate the paging operation at any time by sending a disconnect signal to the control apparatus from the telephone subset. Upon receiving this disconnect signal, the control apparatus immediately resets the master and access timer circuits causing the telephone connection between the control apparatus and the calling subset to be broken, the radio transmitter to be disabled, and the paging tone encoder circuit to be deactivated. In the preferred embodiment of the present invention, the disconnect signal is sent to the control apparatus by depressing the octopher button (#) on the Touch-Tone dial encoder. The control apparatus of the present invention also allows the calling party to initiate an additional page without having to redial the telephone number corresponding to the radio paging system. In response to the return of the annunciator signal, the calling party can obtain additional time to make another page by once again sending the access code to the control apparatus before the access timer completes its timing sequence. When the master timer reaches the end of its timing cycle, the annunciator signal is enabled and the timing sequence of the access timer restarted. If the access code is sent to the control apparatus before the access timer completes its timing sequence, the master timer is restarted thereby providing the calling party with an additional period of time to make a second page without having to redial the phone number associated with the control apparatus. Finally, the calling party may reset the access timer and clear the decoding circuitry if an improper access code is mistakenly sent to the control apparatus. This feature allows the calling party to cancel the improper access code and submit another access code to the control apparatus if the reset signal is received before the access timer reaches the end of its timing sequence.

The unique control features discussed above make the control apparatus of the present invention suitable for use as a transmitter control point. The FCC rules and regulations provide that the licensee of a radio transmitter must maintain exclusive control over the operation of the base station. The control apparatus provides the required control by restricting access to the radio paging system to authorized persons having the access code. By selectively disseminating the access code to authorized persons, only the licensee or his authorized representatives are capable of using the radio paging systems thereby maintaining the necessary control over the radio transmitter. Furthermore, the unique control features incorporated into the control apparatus of the present invention allow the calling party to initiate and control the entire paging operation from a remote telephone subset. As a result of these features, a Touch-Tone telephone satisfies all of the FCC requirements for a phone remote control unit thereby allowing for the control apparatus to be used in a community paging system wherein access to the system is provided through a Touch-Tone telephone.

Referring now to FIGS. 2a and 2b, the control apparatus of the present invention is shown in detail in these figures. As shown in these figures, the control apparatus is provided with a ring line input terminal 100, a common line input terminal 102, and a tip line input terminal 104 for interconnection of the apparatus with its associated telephone line. These input terminals are connected to the telephone line through a conventional Touch-Tone termination circuit which is generally designated by the numral 106. This telephone termination circuit is a standard device which is well known to those skilled in the art. The ring line input terminal and the common line input terminal are connected directly to the telephone termination circuit while the tip line input terminal 104 is connected to the telephone termination circuit through a switch mechanism 110.

Switch mechanism 110 is provided to disconnect the control apparatus from the telephone line in order to transfer control of the apparatus to a local Touch-Tone encoder. This switch mechanism is comprised of a two contact, three gang switch or any other suitable switching mechanism having two switching states and three contacts which move simultaneously. The switching mechanism has three movable contacts which are generally designated by the numerals 112, 114 and 116. Each movable contact has two switch states. The first switch state is represented by stationary contacts 118, 120 and 122 and is called the line control position of the switch. Placement of the switch mechanism in the line control position provides access to the control apparatus from a remote telephone subset through the telephone network. The second switch state, on the other hand, is represented by stationary contacts 124, 126 and 128 and is designated the local control position. When the switch mechanism is in the local control postion, control of the control apparatus is transferred to a Touch-Tone encoder which is located at the control apparatus. Switch mechanism 110 is shown in the line control position so that the telephone termination circuit is electrically coupled with the tip line input terminal 104 through the switching mechanism and the control apparatus is capable of responding to incoming telephone calls.

The control apparatus is also equipped with an audio coupling transformer 130 which electrically couples the control apparatus to its attendant telephone line. This transformer includes a pair of transformer coils which are generally designated by the numerals 132 and 134. One terminal of transformer coil 132 is electrically connected with the common line input terminal 102 through a resistor 136 while the other end of this transformer coil is electrically coupled with the tip line input terminal 104 through a resistor 138 and a relay contact 140. A rectifying bridge 142 is electrically connected to the ring line input terminal 100 by means of a resistor 144 and a capacitor 146. The common line input terminal is also connected to this rectifying bridge through a resistor 148 and capacitor 150.

Rectifying bridge 142 has a relay coil 152 electrically connected across its output terminals. This relay coil controls the switch state of a normally closed relay contact 154. Relay contact 154 operates in conjunction with a power input terminal 156, a capacitor 158, the access timer circuit 160, and a pair of resistors 162 and 164 to activate the control apparatus in response to a ring pulse signal. The access timer circuit is a timing circuit which generates a continuous activation signal for a set period of time once it is triggered by the presence of a voltage signal of the appropriate value at input pin 2. The duration of the activation signal is established by a resistor 166, a variable resistor 168, and a capacitor 170.

The activation signal is generated by the access timer circuit at output pin 3 and is provided to a relay coil 176 and the tone oscillator circuit 178 by means of an inverter 180 which is comprised of a transistor 182 and a pair of resistors 184 and 186. Relay contact 176 is connected in series with power input 188 and is used to control the switch state of normally open relay contact 140. The tone oscillator 178 is an integrated circuit which generates the annunciator signal in the form of a continuous audio tone at output pin 3 in response to the presence of an activation signal at input pin 1. The level of the audio tone is adjusted by a variable resistor 190 before being sent to audio transformer 130 through capacitor 192 and conductor line 194.

A tone decoder circuit generally designated by the numeral 196 is provided to decode the tone signals received by the control apparatus. The tone decoder circuit is a conventional integrated circuit similar to the one manufactured by Telaris Telecommunications, Inc. and identified by their model number 7516-01. This circuit decodes the received tone signals by generating an output signal at the output pin representative of the decoded signal. As shown in this figure, output pin pins 17 through 25 are representative of the digits 1 through 9 respectively, and output pin 26 is representative of the decoded digit 0. These output pins are hardwired to the appropriate input terminals of the paging tone encoder circuit via conductor lines 198, 200, 202, 204, 206, 208, 210, 212, 214, 216 and resistors 218, 220, 222, 224, 226, 228, 230, 232, 234 and 236. In response to a disconnect signal, the tone decoder circuit generates an output signal at pin 28 which is electrically coupled with the base of transistor 237. The tone decoder circuit is electrically coupled with the audio transformer 130 through a filter network 238 which is comprised of inductor 240, capacitors 242, 244, 246, 248 and 250 and resistors 252 and 254. The filter network may be bypassed by connecting a conductor line across terminals 253 and 255.

The paging tone encoder is not shown in FIG. 2 because it is a conventional device which is well known in the art. A typical example of a paging tone encoder suitable for use with this invention is the General Electric type 99 encoder which is capable of encoding up to 900 calls. Another encoder suitable for use with the present invention is the Comex 900 BXP encoder which is capable of encoding 1800 calls. It should be pointed out at this time that the control apparatus of the present invention is capable of being used with any type of paging tone encoder circuit which generates a paging signal commonly used in the radio communications art.

The restrictive access feature is incorporated into the control apparatus by means of the address selector circuit 256. The address selector circuit is a conventional integrated circuit such as the one manufactured by Telaris Telecommunications, Inc. and identified by their model number 7511-01. This circuit is equipped with input pins 23, 24, 25, 26 and 27 and output pin 28 for selecting the length of the access code. The length of the access code is selected by hardwiring output pin 28 to the input pin corresponding to the selected length of the access code. Each of the input represents an access code of a different length with input pins 23, 24, 25, 26 and 27 representing an access code length of 2, 3, 4, 7 and 10 digits respectively. The address selector circuit is also equipped with 10 input pins for accepting the digits of the access code. These input pins are designated by the numerals 2-11 inclusive and are respectively connected to input terminals 258, 260, 262, 264, 266, 268, 270, 272, 274 and 276 by means of conductor lines 278, 280, 282, 284, 286, 288, 290, 292, 294 and 296.

The preselected access code is programmed into the control apparatus by hardwiring the output pin of the tone decoder circuit corresponding to the first digit of the access code to input terminal 258. The second digit of the access code is similarly programmed into the control apparatus by connecting the output terminal corresponding to this digit to input terminal 260 with the other digits of the code being sequentially connected to the remaining input terminals. Once the appropriate number of input pins are activated in the proper sequence, the address selector circuit generates an output signal at pin 14.

Output pin 14 of the address selector circuit 256 is electrically coupled with the master timer circuit 298 through an inverter 300 which is comprised of transistor 302 and resistors 304, 306 and 308. The output of this inverter is electrically coupled with input pin 2 of the master timer circuit through a pair of resistors 310 and 312. The master timer circuit is a timing circuit which controls the duration of the paging operation. This circuit generates at output pin 3 a continuous enable signal for the duration of the time period established by capacitor 314, resistor 316 and variable resistor 318.

In response to this enable signal, the annunciator signal generated by the tone oscillator circuit is disabled, the timing sequence of the access timer is inhibited and the paging tone encoder circuit is activated. The enable signal produced by the master timer is provided to the base of transistor 320 by means of a resistor 322. The collector of transistor 320 is electrically coupled with input pin 4 of the tone oscillator circuit 178 such that the presence of an enable signal at the base of this transistor causes the tone oscillator circuit to be disabled. Transistor 320 is also coupled with the cathode of diode 324 such that the timing sequence of the access timer is inhibited when an enable signal is present at the base of transistor 320. Finally, the collector of transistor 320 is electrically coupled with the anode of diode 326. The cathode of this diode is electrically coupled with the movable contact 112 of switch mechanism 110 by means of a conductor line 328. When switch mechanism 110 is in the line control position as shown in FIG. 2b, movable contact 112 is electrically connected to stationary contact 122 thereby electrically coupling the cathode of diode 326 with the base of transistor 330. Transistor 330 is properly biased by a pair of resistors 332 and 334 and is electrically coupled with the paging tone encoder circuit by means of a conductor line 336. In this way, the collector of transistor 320 is electrically coupled with the paging tone encoder circuit by means of diode 326, conductor line 328, switch mechanism 110 and transistor 330 such that the application of an enable signal to the base of transistor 320 causes the paging tone encoder circuit to be activated. The enable signal from the master timer circuit is also sent to the base of transistor 338 by means of a resistor 340. The collector of transistor 338 is electrically coupled with the cathode of thyristor 342 such that application of an enable signal to the base of this transistor arms the circuitry used to activate the radio transmitter.

The control apparatus is equipped with an input terminal 348 which is electrically coupled with the paging tone encoder circuit so as to accept a transmitter enable singal from the encoder circuit. The transmitter enable signal is produced by the paging tone encoder circuit after the paging signal has been encoded by this circuit and is provided to the control apparatus coincident with the paging tones which make up the paging signal. The control apparatus uses the transmitter enable signal to activate the transmitter thereby allowing for transmission of the paging signal. Input terminal 348 is electrically coupled with the base of transistor 351, the base of transistor 352, and the gate input of thyristor 342 by means of a diode 354 and an inverter 356 which is comprised of a transistor 358 and resistors 360, 362 and 364. Input terminal 348 is also coupled with the anode of thyristor 342 through diode 354, a resistor 368, and a relay coil 370. Transistor 351 is electrically coupled with the master timing circuit 298 by means of a diode 353 to inhibit the timing sequence of the master timer when the paging signal is being transmitted.

The paging tones which make up the paging signal are produced in the paging tone encoder circuit and are provided to the control apparatus at input terminal 350 for controllable application to the radio transmitter. The paging tone are initially amplified in an amplifying network comprised of a pair of transistors 374 and 376 and resistors 378, 380, 382, 384, 386, 388 and 390. The amplified paging tones are then passed through a capacitor 392 and a resistor 394 before being directed to an audio amplifier 396 through an attenuator circuit which is comprised of resistors 398, 400 and 402. The amplified paging tones are also provided to audio transformer 130 through a capacitor 404 for transmission to the calling party over the telephone line. The collector of transistor 351 is also coupled with the audio amplifier 396 by means of a pair of resistors 405 and 406.

The audio amplifier is coupled with its attendant transmitter such that the audio tones provided to the transmitter from this circuit are used to modulate the transmitter. The audio amplifier is coupled with the transmitter through a line transformer 408. Coupling transformer 408 is equipped with a primary coil 410 which is electrically connected with the output of the audio amplifier by means of a capacitor 412 and a resistor 414. The secondary coil of this transformer is comprised of a pair of transformer windings 416 and 418 which have a capacitor 420 interpositioned between them. Transformer coil 416 is connected directly to a low impedance output terminal 422 and to a high impedance output terminal 424 through a capacitor 426 and a resistor 428. A common terminal 430 is electrically coupled with transformer winding 418.

Operating power is derived in the control apparatus from a standard 110 volt, 60 Hertz power signal received on leads 432 and 434 from a wall plug not shown in this figure. The incoming power signal is stepped down to a lower voltage in a transformer 436 which is comprised of a primary coil 438 and a pair of secondary coils 440 and 442. The primary coil is connected to leads 432 and 434 through a switch mechanism 444 which is arranged to turn the paging terminal on and off. Operating power is also sent to the paging tone encoder by means of conductor lines 446 and 448.

Transformer coil 440 is electrically coupled with a rectifying bridge circuit 450. This bridge converts the alternating current signal developed across transformer coil 440 into a DC voltage signal. The output terminals of the rectifying bridge circuit are connected to a power output terminal 452 through a filtering network comprised of resistor 454 and capacitors 456 and 458. The DC voltage signal is distributed to the operating components in the control apparatus by electrically connecting output terminal 452 to the various power input terminals.

If the control apparatus is remote from its radio transmitter, the apparatus may be connected to the transmitter over a leased telephone line or some other appropriate transmission line. In this mode of operation, the apparatus is arranged to produce a transmitter control signal which is capable of controlling the operation of the transmitter. This control signal is derived in transformer coil 442 from the power signal received at leads 432 and 434. Transformer coil 442 provides the control signal to the secondary coil of transformer 408 through a pair of diodes 460 and 462 which are arranged to form a full wave rectifier and a filtering network comprised of capacitors 464 and 466 and resistors 468, 470 and 472. A relay contact 474 is provided to regulate transmission of the transmitter enable signal to the transmitter via the leased telephone line. The switch state of relay contact 474 is controlled by relay coil 370 such that this contact is closed when the relay coil is energized.

If the control apparatus is not placed at a remote location, jumper connections 476, 478 and 480 are removed thereby removing the transmitter control circuitry from the control apparatus. In this mode of operation, relay contact 474 is connected within the transmitter itself such that energization of relay coil 370 activates the transmitter directly.

In operation, a user may initiate a page through the control apparatus of the present invention by dialing the seven digit telephone number assigned to the telephone termination circuit associated with the control apparatus. Dialing the telephone number assigned to the control apparatus from a Touch-Tone telephone causes a ring pulse signal to be produced in the telephone termination network 106. This ring pulse signal is provided to the rectifying bridge 142 through input terminal 100. The rectifying bridge converts the alternating current ring pulse signal into a DC voltage signal which is applied to relay coil 152. In this way, relay coil 152 is energized for a period of time corresponding to the duration of the ring pulse signal. Energization of the relay coil 152 causes normally closed contact 154 to open for the period of time that the coil is energized. When relay contact 154 is in its normally closed position, capacitor 148 is being charged by the positive voltage signal being provided to it from the power input 156 through resistor 162 and normally closed relay contact 154. However, capacitor 158 begins to discharge through resistor 164 as soon as normally closed relay contact 154 is opened. The charge stored on capacitor 158 acts as a trigger signal for the access timer circuit 160. Access timer circuit 160 is inactive as long as the charge stored on capacitor 158 is above a preselected level. However, once the charge on capacitor 158 drops below the trigger value, the access timer circuit is activated thereby initiating the timing sequence of this circuit causing an activation signal to be generated at output pin 3. The natural response of capacitor 158 and resistor 64 is selected such that this capacitor reaches the trigger level just before the ring pulse signal is terminated In this way, the control apparatus only responds to a ring pulse signal representative of an incoming call thereby decreasing the possibility of being accidentally activated in response to a false signal.

The access timer circuit established the time period during which a proper access code must be provided to the cntrol apparatus by the calling party from the Touch-Tone telephone. If a proper access code is not provided to the paging terminal within the time period established by the access timer circuit, this circuit automatically disconnects the phone connection. The access timer circuit generates at output pin 3 a continuous activation signal for a period of time which is established by resistor 166, variable resistor 168 and capacitor 170.

The activation signal is inverted in inverter 180 before being used to energize relay coil 176 and to activate the tone oscillator circuit 178. Energization of relay coil 176 causes normally open contact 140 to be closed thereby connecting the telephone line to the coupling transformer 130. In this way, the control apparatus answers the incoming telephone call and establishes a communicative link between the calling party and the control apparatus.

Activation of the tone oscillator causes it to generate an annunciator signal. The annunciator signal is a continuous audio tone which is sent from the tone oscillator circuit to the coupling transformer 130 through a level adjustment network comprised of the variable resistor 190. The annunciator signal is sent to the calling party to indicate to this party that his call has been answered by the control apparatus and that he has gained limited access to the radio paging system. In response to the annunciator signal, the calling party must send the appropriate access code to the control apparatus within the time period established by the access timer circuit or his telephone connection with the control apparatus will be automatically terminated.

The access code is comprised of a coded sequence of audio tones which are generated by depressing the appropriate buttons on the Touch-Tone dial encoder of the calling subset. The access code may have a variable length of from one to ten digits. For the purposes of discussion, it will be assumed that the access code consists of the digits "234". In response to the annunciator signal, the calling party transmits this access code to the control apparatus by sequentially depressing the buttons on his Touch-Tone dial encoder designated by the numerals 2, 3 and 4. Depressing each of these buttons causes a unique audio tone to be generated. These audio tones are then transmitted from the calling subset to the control apparatus over the telephone network.

These audio tones are received by the control apparatus at the tip input terminal 104. The received audio tones are then sent to the tone decoder circuit 196 through the coupling transformer 130 and the filtering network 238. The tone decoder circuit detects the received audio tones and produces an output of the pin corresponding to the detected audio tone. As mentioned above, output pins 17 through 25 represent the audio tones corresponding to the digits 1 through 9, respectively, while output pin 26 represents the audio tone corresponding to the digit 0. In response to the access code consisting of the digits "234", the tone decoder circuit sequentially produces an output at pins 18, 19 and 20 in response to receipt of the audio tones corresponding to this access code.

The validity of the received access code is then checked in the address selector circuit 256. This circuit checks the received code against a reference code programmed into this conduit and generates an output signal at pin 14 if the received code corresponds to the reference code. The reference code is programmed into this circuit by first connecting output pin 28 to the input which corresponds to the length of the access code. As shown in FIG. 2, input pins 23, 24, 25, 26 and 27 represent access codes of 2, 3, 4, 7 and 10 digits respectively. Therefore, by connecting output pin 28 to input pin 24, the address selector circuit is set to look for an access code consisting of three digits. The actual digits of the code are then programmed into these circuit by sequentially connecting the appropriate output pin of the tone decoder circuit to the proper input pin of the address selector circuit. In other words, the first digit of the access code is programmed into the address selector circuit by connecting the output pin of the tone decoder circuit which corresponds to this digit to input pin 2 of the address selector circuit. Similarly, the second digit of the code is programmed in by connecting the output pin of the tone decoder circuit which corresponds to this digit to the third input pin of the address selector circuit and so on. The address selector circuit is equipped with ten input pins 2–11 and consequently can accommodate an access code of up to ten digits. If the access code consists of the digits "234", then output line 200 of the tone decoder circuit is electrically coupled with input terminal 258 of the address selector circuit, output line 202 is electrically coupled with input terminal 260, and output line 204 is electrically connected with input terminal 262.

The address selector circuit checks the validity of the received access code by monitoring the order in which its input pins are energized. In order for the address selector circuit to validate the received access code, the set number of pins must be energized in the proper sequential order, i.e., pins 2–11 in sequence. In other words, the address selector circuit generates an output signal at pin 14 only if the appropriate number of input pins are energized in the proper sequence.

The master timer circuit is activated in response to the output signal from pin 14 of the address selector circuit. Activation of the master timer circuit initiates the timing sequence of this circuit. During its timing sequence, the master timer circuit generates an enabling signal which performs a number of functions including inhibiting the timing sequence of the access timer circuit, disabling the tone oscillator circuit 178, enabling the paging tone encoder circuit, and arming the circuitry used to activate the radio transmitter. This enabling signal is produced by the master timing circuit at output pin 3 for the duration of the time period established by resistor 316, variable resistor 318 and capacitor 314.

The enable signal is inverted in transistor 320 before being used to inhibit the timing sequence of the access timer circuit 160, disable the tone oscillator circuit 178 and enable the paging tone encoder circuit. The inverted enable signal is simultaneously provided to input pin 4 of the tone oscillator circuit, to the cathode of diode 324, and to the base of switching transistor 330 through diode 326 and switching mechanism 110. Application of this signal to input pin 4 of the tone oscillator circuit 178 disables this circuit thereby terminating the annunciator signal. Termination of the annunciator signal indicates to the calling party that the access code has been checked and validated and that the control apparatus is in condiction to accept paging information.

The presence of this signal at the cathode of diode 324 inhibits the timing sequence of the access timer circuit thereby preventing this circuit from timing out and breaking the telephone connection. If the received access code is invalid, the timing sequence of the access timer circuit is not inhibited and the activation signal generated by output pin 3 is terminated upon completion of this circuit's timing sequence. Termination of the activation signal generated at output pin 3 of the access timer circuit de-energizes relay coil 176 causing relay contact 140 to return to its normally open condition. When relay contact 140 is open, the phone connection is broken and the calling party must redial the number to once again gain access to the control apparatus.

The inverted enable signal activates the paging tone encoder circuit by activating switching transistor 330. The inverted enabling signal is provided to the base of switching transistor 330 through diode 326, conductor line 328, and switching mechanism 110. In response to the inverted enable signal, the switching transistor is turned on thereby providing an activation signal to the paging tone encoder circuit by means of conductor line 336. The enable signal also arms the circuitry used to activate the paging transmitter. The enable signal is provided to the base of switching transistor 338 by means of resistor 340. The presence of this signal at the base of transistor 330 causes this transistor to be saturated thereby providing a circuit path from thyristor 342 to ground through this transistor.

Thereafter, the control apparatus is in condition to accept information concerning the mobile unit to be contacted. This paging information is provided to the control apparatus in the form of a coded audio signal which corresponds to the address of the party to be paged. The received audio tones are sent from the phone line to the tone decoder circuit 196 by means of coupling transformer 130 and filtering network 238. The tone decoder circuit decodes the received audio tones representative of the unit to be paged by providing at output pins 17 through 26 the appropriate group of signals needed to program the paging tone encoder circuit. These signals are sent from the tone decoder circuit to the paging tone encoder by means of output lines 198–216. The paging tone encoder circuit converts these control signals into a paging signal representative of the mobile pager to be paged. A paging signal corresponding to each of the mobile pagers is stored in the paging tone encoder circuit and the appropriate paging signal is selected from memory by the encoder circuit in response to the control signals provided to it from the tone decoder circuit. The paging signal is comprised of a coded sequence of tone signals which are encoded in any manner commonly used in radio communications art. The paging tone encoder to be used in combination with the control apparatus of the present invention is of standard design and consequently is not shown or described in great detail herein.

Once the paging signal has been encoded, the paging tone encoder circuit sends the paging tones which make up the paging signal to the control apparatus. The paging tone encoder circuit also sends a tone enable signal to the control apparatus coincident with the paging tones. The tone enable signal is provided to the control apparatus at input terminal 348 while the paging tones are provided to input terminal 350. The tone enable signal causes the radio transmitter to be activated by triggering thyristor 342 thereby energizing relay coil 370. Energization of relay coil 370 causes the normally open relay contact 474 to be closed thereby activating the radio transmitter. The tone enable signal is also used to drive transistor 352 which provides an inhibit signal to the master timer circuit. This inhibit signal causes the master timer circuit to be inhibited while the paging signal is being transmitted. Once the paging sequence is completed, the tone enable signal is removed from input terminal 348 thereby causing the timing sequence of the master timer to continue.

The paging tones are initially amplified by transistors 374 and 376. The amplified paging tones are then sent to the audio amplifier 396 through the attenuator network comprised of resistors 398, 400 and 402. Further attenuation of the paging tones is accomplished by splitting the paging tones and directing a portion of the tone signal to ground through resistors 405 and 406. Switching transistor 351 is saturated in response to the tone enable signal thereby providing a circuit path to ground for the amplified paging tones through resistors 405 and 406.

The amplified paging tones are also sent to the calling party over the telephone line so that the calling party hears the paging tones as they are being transmitted. The amplified paging tones are introduced into the telephone line by means of capacitor 404 and coupling transformer 130. Once transmission of the paging signal is complete, the tone enable signal is removed from input terminal 348 causing the attenuation at input pin 2 of audio amplifier 296 to be removed and the telephone line to be coupled with the audio amplifier. Thereafter, the calling party is capable of making a voice announcement to the paged party.

If the radio transmitter is near the control apparatus, jumper lines 476, 478 and 480 are removed and relay contact 474 is connected directly to the transmitter such that closure of this contact automatically activates the transmitter in response to a tone enable signal. The paging tones are then sent directly from the audio amplifier 396 to the radio transmitter through line transformer 408. The paging tones are used to modulate the transmitter to thereby broadcast the paging signal. However, the control apparatus of the present invention is also capable of being used with a radio transmitter which is placed at a remote location. If the radio transmitter is located some distance from the control apparatus, the control apparatus is coupled with the radio transmitter by means of a leased telephone line or some other appropriate transmission line which is connected to the audio amplifier at output terminals 424 and 430. In this case, the control apparatus activates the radio transmitter by sending a DC transmitter control signal to the transmitter over the transmission line which connects the control apparatus to the radio transmitter. As shown in FIGS. 2a and 2b, energization of relay coil 370 in response to a tone enable signal causes relay contact 474 to be closed. Closure of relay contact 474 causes a DC transmitter control signal to be injected into the transmission line. This DC transmitter control signal is a DC current which is derived from the incoming power signal by transformer coil 442 and converted into direct current by means of a full wave rectifier comprised of diodes 460 and 462. The rectified signal is filtered in a filter network comprised of resistors 468, 470 and 472 and capacitors 464 and 466. Closure of relay contact 474 causes the DC transmitter control signal to be introduced to the transmission line at the secondary coil of line transformer 408. The secondary coil is comprised of a pair of transformer windings 416 and 418 which have a capacitor 420 positioned between them. This arrangement permits the secondary coil to be split into two separate windings so that the DC transmitter control signal can be applied to the transmission line while making the secondary coil appear as one continuous winding for the paging tones. In this way, both the paging tones and the transmitter control signal can be fed into the transmission line through line transformer 408.

The radio transmitter is connected to the transmission line such that a relay circuit at the transmitter is activated in response to the DC transmitter control signal. In this way, the relay in the transmitter operates in step with relay contact 474. In the transmitter, the paging tones are fed into a line transformer which in turn feeds the circuitry used to modulate the radio transmitter to thereby broadcast the paging signal.

When the master timer reaches the end of its timing sequence, the enable signal generated by this circuit is terminated. Termination of the enable signal removes the disabling signal provided to pin 4 of the tone oscillator circuit causing the annunciator signal to be once again sent to the calling party. Resumption of the annunciator signal indicates to the calling party that the time period for verbal communication is drawings to a close. Termination of the enable signal also removes the inhibit signal provided to the cathode of diode 234 causing the access timer circuit to continue its timing sequence from the point at which it was inhibited. The activation signal provided to the paging tone encoder circuit by means of diode 326, conductor line 328, switching mechanism 110, transistor 330 and conductor line 336 is also removed in response to termination of the enable signal. Finally, termination of the enable signal causes switching transistor 338 to be turned off thereby breaking the circuit path from thyristor 342 to ground through the transistor. Breaking this circuit path causes relay coil 370 to be de-energized. Relay contact 474 opens in response to the de-energization of the relay coil causing the radio transmitter to be deactivated. Opening of relay coil 370 either deactivates the radio transmitter directly or discontinues the DC transmitter control signal causing the radio transmitter to be deactivated indirectly.

When the access timer circuit reaches the end of its timing cycle, the activation signal produced at output pin 3 of this circuit is terminated. Termination of this activation signal causes relay coil 176 to be de-energized and the tone oscillator circuit to be deactivated. De-energization of relay coil 176 causes relay contact 140 to return to its normally open condition thereby breaking the telephone connection between the control apparatus and the calling subset. However, the calling party can initiate a second page before the telephone connection is broken if he sends a proper access code to the control apparatus in response to the resumption of the annunciator tone. If this access code is received before the access timer reaches the end of its timing cycle, the master timer circuit is restarted and the calling party may initiate a second page. This access code is decoded and validated as described above. If a valid code is received before the access timer circuit completes its timing sequence, the master timer circuit is restrated causing the access timer circuit to be once again inhibited, the tone oscillator enabled, the paging tone encoder circuit activated, and the transmitter control circuitry armed. The calling party then initiates a page by providing paging information to the control apparatus as described above.

The calling party can terminate the paging operation at any time by simply sending a disconnect signal to the control apparatus from the telephone subset. In the preferred embodiment of the invention, the disconnect signal is sent to the control apparatus by depressing the octopher button (#) on the Touch-tone dial encoder of the telephone subset. The disconnect signal is received by the control apparatus at input terminal 104 and is sent to the tone decoder circuit through coupling transformer 130 and filtering network 238. In response to a disconnect signal, the tone decoder circuit produces an output at point 28. This output signal is sent to the base of transistor 237 by means of resistor 421. Application of this output signal to the base of transistor 237 causes both the master timer circuit and the access timer circuit to be reset thereby terminating the enable signal from the master timer circuit and the activation signal from the access timer circuit. Termination of these two signals results in the breaking of the telephone connection, disabling of the tone oscillator circuit, deactivation of the paging tone encoder circuit and deactivation of the radio transmitter. Thereafter, the control apparatus is in condition to initiate a new page by answering another telephone call.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A radio paging system comprising:
   a plurality of telephone subscriber subsets operable to generate a plurality of tone singals, each telephone subset having an individual telephone dial number and being coupled with a telephone exchange network;
   a plurality of mobile pagers, each pager being responsive to an individually coded paging signal;
   paging tone encoder means for generating a plurality of individually coded paging signals, each paging signal corresponding to a different mobile pager;
   means for transmitting said paging signal; and
   a control apparatus coupled with said telephone exchange network through a telephone subscriber subset such that said control apparatus is capable of receiving a ring pulse signal from a calling telephone subset, said control apparatus including:
   means for receiving a ring pulse signal from said calling telephone subset, said receiving means being operable to produce a trigger signal in response to a ring pulse signal from said calling telephone subset;
   access timing means for establishing a time period of a set duration, said access timing means being operable to initiate said timing operation in response to said trigger signal;
   means for checking the validity of a coded access tone signal received from the calling telephone subset, said validity checking means being operable to produce an output if a valid access tone signal is received within the time period established by said access timing means;
   master timing means for generating an enable signal for a set period of time, said master timing means being operable to initiate generation of said enable signal in response to said output;
   means for coupling the calling telephone subset with said paging tone encoder means for the duration of said enable signal; and
   means for coupling said paging tone encoder means with said transmitting means for the duration of said enable signal.

2. The invention as in claim 1 wherein said control apparatus includes means for effectuating uncoupling of said control apparatus from said calling telephone subset, for effectuating uncoupling of said calling telephone subset from said paging tone encoder means, and for effectuating uncoupling of said paging tone encoder means from said transmitting means in response to a properly coded disconnect tone signal from said calling telephone subset.

3. The invention as in claim 1 wherein said access timing means includes means for restarting the timing operation of said access timing means in response to a properly coded reset tone signal from said calling telephone subset.

4. The invention as in claim 1 wherein said control apparatus includes means for generating an activation signal during the time period established by said access timing means, means for producing an audio tone in response to said activation signal and means for delivering said audio tone to the calling telephone subset.

5. The invention as in claim 1 wherein said validity checking means is comprised of a tone decoder means for converting said received access tone signal into a sequence of output signals and means for monitoring the said sequence of output signals, said monitoring means being operable to validate the received access tone signal when the proper sequence of output signals is produced.

6. The invention as in claim 1 wherein said control apparatus includes means for inhibiting the timing operation of said access timing means in response to said enable signal.

7. The invention as in claim 1 wherein said control apparatus includes means for resetting said access timing means to thereby terminate said activation signal and for resetting said master timing means to thereby terminate said enable signal in response to a properly coded disconnect signal sent to said control apparatus from said calling telephone subset.

8. The invention as in claim 1 wherein said control apparatus includes means for placing said control apparatus in condition to receive paging information from said calling telephone subset in response to said enable signal, said paging information being comprised of at least one tone signal representative of a particular mobile pager.

9. The invention as in claim 8 wherein said control apparatus includes means for receiving said paging information from said calling telephone subset and for using said paging information to effectuate generation by said paging tone encoder means of a paging signal corresponding to the mobile pager represented by said paging information.

10. The invention as in claim 9 wherein said control means includes means for activating said transmitting means in response to generation of said paging signal by said paging tone encoder means.

11. The invention as in claim 10 wherein said control apparatus includes means for providing said paging signal to said calling telephone subset as said paging signal is being generated.

12. The invention as in claim 10 wherein said control means includes means for coupling said calling telephone subset with said transmitting means after generation of said paging signal by said paging tone encoder.

13. The invention as in claim 10 including means for coupling said paging tone encoder means with a remote transmitting means.

14. The invention as in claim 13 wherein said means for coupling said paging tone encoder means with a remote transmitting means is comprised of:
a transmission line for coupling said paging tone encoder means with said transmitting means, said transmission line being operable to transmit said paging signal from said paging tone encoder means to said transmitting means;
means for generating a transmitter control signal in response to generation of said paging signal by said paging tone encoder means;
means for injecting said transmitter control signal into said transmission line; and
means for sensing the presence of said transmitter control signal in said transmission line, said sensing means being operable to activate said transmitting means in response to said transmitter control signal.

15. A control apparatus for communicatively coupling a radio paging system comprising a plurality of mobile pagers, each pager being operable to respond to an individually coded paging signal; a paging tone encoder means for generating a plurality of paging signals, each paging signal corresponding to a particular mobile pager; and a transmitter means for transmitting said paging signals with a telephone subscriber subset operable to generate a plurality of tone signals, said telephone subscriber having an individual telephone dial number and being interconnected with a telephone exchange network, said apparatus comprising:
means for coupling said apparatus to said telephone exchange network through a telephone subscriber subset having an individual telephone dial number, said telephone coupling means being operable to complete a telephone connection between said control apparatus and a calling telephone subset in response to a ring pulse signal from said calling telephone subset;
means for breaking said telephone connection between said control apparatus and said calling telephone subset if a properly coded access signal is not received from said calling telephone subset within a set period of time after completion of said telephone connection;
means for receiving paging information from said calling telephone subset after a properly coded access tone signal has been received from said calling telephone subset, said paging information being comprised of at least one tone signal representative of a particular mobile pager, said receiving means being operable to use said paging information to effectuate generation by said paging tone encoder means fo a paging signal corresponding to the mobile pager represented by said paging information; and
means for breaking said telephone connection between said calling telephone subset and said control apparatus a set period of time after completion of said telephone connection.

16. The invention as in claim 15 including means for producing an audio tone, said tone producing means being operable to deliver said audio tone to said calling subset upon completion of said telephone connection between said calling telephone subset and said control apparatus.

17. The invention as in claim 16 wherein said control apparatus includes means for discontinuing delivery of said audio tone to said calling subset upon receipt of said properly coded access tone signal.

18. The invention as in claim 15 including means for activating said transmitting means in response to generation of said paging signal by said paging tone encoder means.

19. The invention as in claim 15 wherein said control apparatus includes means for coupling said calling telephone subset to said transmitting means following generation of said paging signal by said paging tone encoder means.

20. The invention as in claim 15 wherein said control apparatus includes means for providing said paging signal to said calling telephone subset as said paging signal is being generated by said paging tone encoder means.

21. The invention as in claim 15 wherein said control apparatus includes means for breaking said telephone connection between said calling telephone subset and said control apparatus in response to a properly coded disconnect signal.

22. The invention as in claim 15 wherein said control apparatus includes means for coupling said paging tone encoder means to a remote transmitting means.

23. The invention as in claim 22 wherein said means for coupling said paging tone encoder means to a remote transmitting means is comprised of:
a transmission line for coupling said paging tone encoder means to said transmitting means, said transmission line being operable to transmit said paging signals from said paging tone encoder means to said transmitting means;
means for producing a transmitter control signal in response to generation of said paging signal by said paging tone encoder means;
means for injecting said transmitter control signal into said transmission line; and
means for detecting said transmitter control signal, said detecting means being operable to activate said transmitting means in response to said transmitter control signal.

24. A method for controlling access to a radio paging system comprising a plurality of mobile pagers, each pager being operable to respond to an individually coded paging signal; a paging tone encoded means for generating a plurality of paging signals, each paging signal corresponding to a particular mobile pager; and a transmitter for transmitting said paging signal from a telephone subscriber subset operable to generate a plurality of tone signals, said telephone subscriber having an individual dial number and being interconnected with a telephone exchange network, said method comprising the steps of:
- connecting said radio paging system to said telephone exchange network through a control apparatus such that said radio paging system is assigned its own dial number;
- completing a telephone connection between said control apparatus and a calling telephone subset;
- breaking said telephone connection if a properly coded access signal is not received by said control apparatus from said calling telephone subset within a set time period;
- restarting said set time period upon receipt of a properly coded reset tone signal from said calling telephone subset;
- accepting paging information from said calling telephone subset after said properly coded access tone signal has been received, said paging information being representative of a particular mobile pager; and
- using said paging information to effectuate generation of a paging signal by said paging tone encoder means.

25. The method as in claim 24 including the step of breaking said telephone connection a set period of time after completion of said telephone connection.

26. The method as in claim 24 including the step of breaking said telephone connection in response to a properly coded disconnect tone signal from said calling telephone subset.

27. The method as in claim 24 including the step of requesting said access tone signal from said calling telephone subset during said time period by providing an audio tone to said calling telephone subset.

* * * * *